United States Patent
Simister

[15] 3,691,790
[45] Sept. 19, 1972

[54] COUPLINGS
[72] Inventor: Harry Simister, Olton, Solihull, Warwickshire, England
[73] Assignee: Joseph Lucas (Industries) Ltd., Birmingham, England
[22] Filed: May 18, 1971
[21] Appl. No.: 144,614

[52] U.S. Cl. ........................... 64/23, 64/21, 64/23.7
[51] Int. Cl. ............................................... F16d 3/06
[58] Field of Search ........................... 64/21, 23, 23.7

[56] References Cited

UNITED STATES PATENTS

| | | | |
|---|---|---|---|
| 2,578,763 | 12/1951 | Trbojerich | 64/21 |
| 2,908,152 | 10/1959 | Anderson | 64/23 |
| 2,952,145 | 9/1960 | Thompson | 64/23.7 |
| 3,083,548 | 4/1963 | Zeidler | 64/21 |

*Primary Examiner*—Kenneth W. Sprague
*Attorney*—Holman & Stern

[57] ABSTRACT

A coupling for transmitting rotary motion between two parts while permitting relative axial movement between the parts wherein one of the parts is tubular. The tubular part contains segmental portions providing a plurality of angularly spaced surfaces which lie substantially in planes which are radially disposed with respect to its axis. The other part is co-axially mounted within the tubular part and has a plurality of angularly spaced surfaces which are opposed and complementary to the surfaces on the segmental portions. Moreover, there is formed in each pair of opposed and complementary surfaces a pair of substantially semi-circular and longitudinally extending grooves which are oppositely inclined at substantially equal angles to the axis of the tubular part and a single ball is accommodated at the point of intersection of each pair of grooves; the ball having a diameter substantially equal to the diameter of the grooves.

1 Claim, 1 Drawing Figure

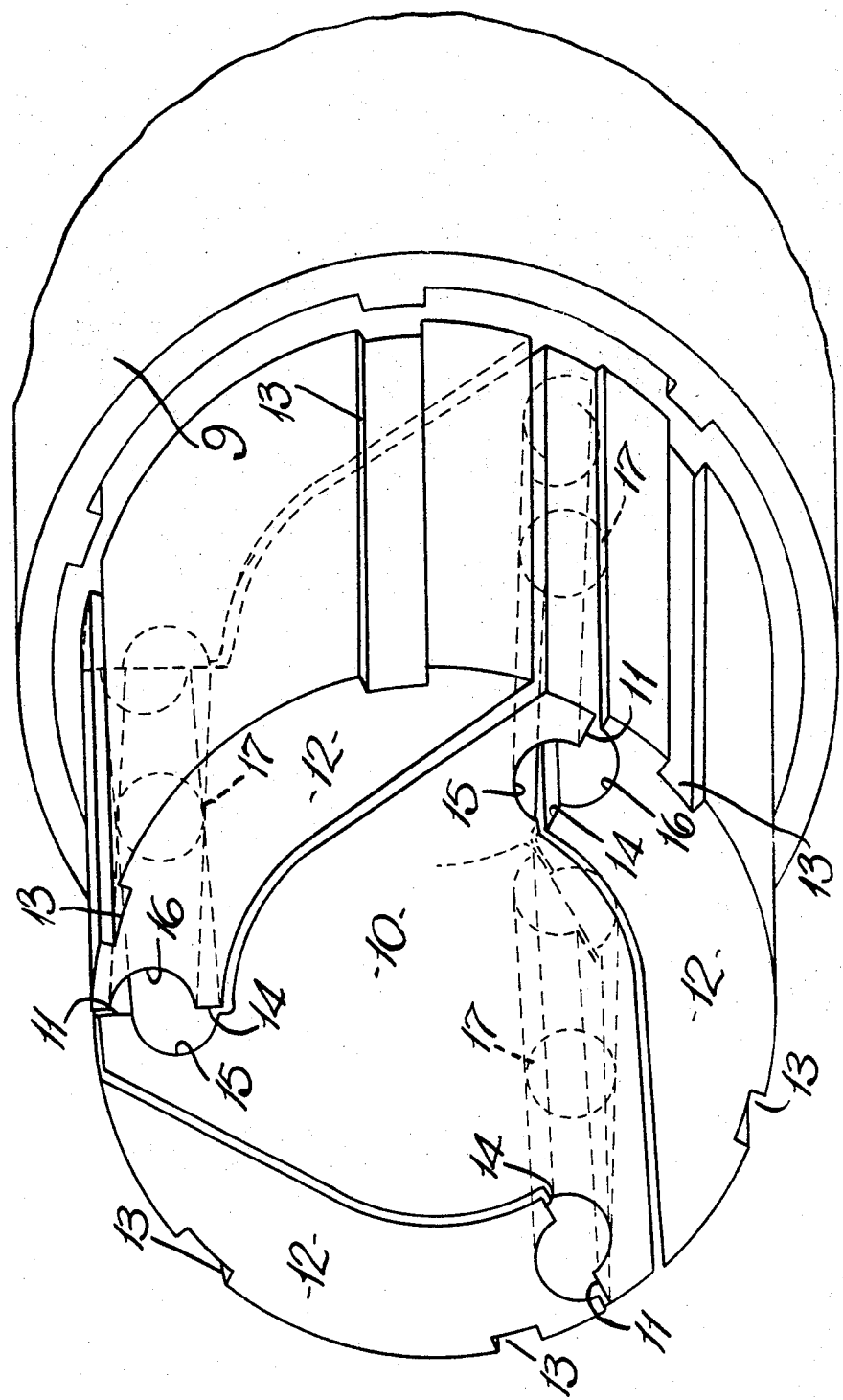

COUPLINGS

This invention relates to couplings for transmitting rotary motion from one part to another part whilst permitting limited relative axial movements between the two parts.

The object of the invention is to provide such a coupling in a convenient form.

According to the invention a coupling for transmitting rotary motion between two parts whilst permitting relative axial movement between the said parts, is characterized in that one of the parts is tubular and has therein segmental portions providing a plurality of angularly spaced surfaces which lie substantially in planes which are radially disposed with respect to the axis of the tubular part and the other part is co-axially mounted within the tubular part and has a plurality of angularly spaced surfaces which are opposed and complementary to the surfaces on the segmental portions, each pair of opposed and complementary surfaces having formed therein respectively a pair of substantially semi-circular and longitudinally extending grooves which are oppositely inclined at substantially equal angles to the axis of the tubular part and accommodate at their point of intersection a single ball of a diameter substantially equal to the diameter of the grooves.

In the accompanying drawing sufficient of an example of the invention is shown in perspective for an understanding of the invention.

Referring to the drawing, there is provided a driving shaft 10, a part of which is shaped to the cross-section illustrated so to provide three surfaces 11 which are located respectively in three equi-angularly spaced planes which are substantially radial with respect to the axis of rotation of the shaft 10.

The driven part of the coupling comprises a tubular portion 9 in which are mounted three equi-angularly spaced segments 12, the segments having external female splines 13 for the reception of male splines on the interior of the tubular portion. Each segment 12 has a surface 14 which is opposed to one of the surfaces 11 respectively and extends in a plane which is substantially radially disposed with respect to the axis of rotation of the shaft 10 and the co-axial tubular portion 9.

In the surfaces 11 respectively are three longitudinal and semi-circular grooves 15, whilst in the surfaces 14 are longitudinal and semi-circular grooves 16. The grooves 15 and 16 are oppositely inclined at a small angle to the axis of the shaft 10, and at the point of intersection of each pair of opposed grooves 15,16 is accommodated a single ball 17 of a diameter substantially equal to the common diameter of the grooves.

In use, rotation of the shaft 10 will be imparted through the balls 17 to the segments 12 and hence to the tubular portion 9. At the same time axial movement of the shaft 10 relative to the segments 12, or vice versa, is permitted, due to the equal and opposite inclination of the grooves. Moreover, due to the opposite inclinations of the grooves no means is required to prevent the balls from escaping from the grooves provided the relative axial movement between the shaft 10 and segments 12 is suitably limited.

I claim:

1. A coupling for transmitting rotary motion between two parts while permitting relative axial movement between the said parts, characterized in that one of the parts is tubular and has therein segmental portions providing a plurality of angularly spaced surfaces which lie substantially in planes which are radially disposed with respect to the axis of the tubular part and the other part is co-axially mounted within the tubular part and has a plurality of angularly spaced surfaces which are opposed and complementary to the surfaces on the segmental portions, each pair of opposed and complementary surfaces having formed therein respectively a pair of substantially semi-circular and longitudinally extending grooves which are oppositely inclined at substantially equal angles to the axis of the tubular part and accommodate at their point of intersection a single ball of a diameter substantially equal to the diameter of the grooves.

* * * * *